United States Patent
Sun et al.

(10) Patent No.: US 10,831,029 B2
(45) Date of Patent: Nov. 10, 2020

(54) SYSTEMS AND METHODS OF ATTENUATING LIGHT IN A DISPLAY

(71) Applicant: Microsoft Technology Licensing, LLC, Redmond, WA (US)

(72) Inventors: Ruipeng Sun, Pleasanton, CA (US); Yarn Chee Poon, Sammamish, WA (US); Chuan Pu, Foster City, CA (US); Richard Allen James, Woodinville, WA (US); Joshua Owen Miller, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 217 days.

(21) Appl. No.: 15/877,218

(22) Filed: Jan. 22, 2018

(65) Prior Publication Data
US 2019/0227315 A1 Jul. 25, 2019

(51) Int. Cl.
*G02B 26/08* (2006.01)
*G02B 26/10* (2006.01)
(Continued)

(52) U.S. Cl.
CPC ............ *G02B 27/0172* (2013.01); *G02B 5/22* (2013.01); *G02B 26/0816* (2013.01);
(Continued)

(58) Field of Classification Search
CPC ........... G02B 27/0093; G02B 27/0101; G02B 27/01; G02B 27/0103; G02B 27/0172; G02B 27/14; G02B 27/104; G02B 27/106; G02B 27/1006; G02B 27/225; G02B 26/023; G02B 26/105; G02B 26/0816; G02B 26/0833; G02B 26/266; G02B 2027/0112; G02B 2027/0114; G02B 2027/0118; G02B 5/20; G02B 5/22; G02B 5/30; G02B 5/205; G02B 27/108; G02B 27/126; G02B 27/141–145;
(Continued)

(56) References Cited

U.S. PATENT DOCUMENTS

2005/0012870 A1 1/2005 Hirata et al.
2006/0274320 A1* 12/2006 Caplan ................ G02B 6/2726
356/491

(Continued)

FOREIGN PATENT DOCUMENTS

WO 2016145064 A1 9/2016

OTHER PUBLICATIONS

"International Search Report and Written Opinion Issued in PCT Application No. PCT/US18/068097", dated May 10, 2019, 12 pages.

*Primary Examiner* — Mustak Choudhury
(74) *Attorney, Agent, or Firm* — Ray Quinney & Nebeker P.C.; John O. Carpenter

(57) ABSTRACT

A display system includes a first light source, a second light source, at least one movable mirror, and an attenuator. The first light source is configured to provide a first light in a first optical path. The second light source is configured to provide a second light in a second optical path. A portion of the second optical path overlaps the first optical path in an overlapping portion. The attenuator is positioned in at least the first optical path and configured to attenuate at least the first light. The movable mirror is movable to deflect the overlapping portion.

20 Claims, 5 Drawing Sheets

(51) Int. Cl.
  *G02B 26/12* (2006.01)
  *G02B 27/01* (2006.01)
  *G02B 5/22* (2006.01)
  *G02B 27/10* (2006.01)
  *G02B 27/14* (2006.01)
  *G01J 1/00* (2006.01)
  *G02B 6/26* (2006.01)

(52) U.S. Cl.
  CPC ......... *G02B 26/105* (2013.01); *G02B 27/104* (2013.01); *G02B 27/1006* (2013.01); *G02B 27/14* (2013.01); *G01J 1/00* (2013.01); *G02B 6/266* (2013.01); *G02B 2027/0112* (2013.01); *G02B 2027/0118* (2013.01)

(58) Field of Classification Search
  CPC ......... G02B 27/1093; G06F 3/011–013; G06F 3/016; G06F 3/017; G06F 3/0304; G06F 3/0482; G06F 3/147; G01J 1/00; G09G 3/003; G03F 7/70066; G03F 7/70466; G03F 7/70208; G03F 7/70108
  See application file for complete search history.

(56) References Cited

U.S. PATENT DOCUMENTS

| | | | |
|---|---|---|---|
| 2015/0205093 A1 | 7/2015 | Irzyk | |
| 2016/0346058 A1* | 12/2016 | Bacher | A61B 90/30 |
| 2017/0238798 A1* | 8/2017 | Isogai | A61B 3/102 |
| 2017/0290131 A1* | 10/2017 | Ito | H04L 9/3268 |

\* cited by examiner

SYSTEMS AND METHODS OF ATTENUATING LIGHT IN A DISPLAY

CROSS-REFERENCE TO RELATED APPLICATIONS

N/A

BACKGROUND OF THE DISCLOSURE

Augmented reality (AR) and mixed reality (MR) display systems allow a user to experience visual information presented from a computer simultaneously with ambient light from the user's surroundings. One method for allowing a user to view their surroundings while receiving additional visual information introduced in their field of view is a waveguide. A waveguide allows ambient light to reach a user's eyes, while also allowing light from a display device to be directed to the user's field of view and combined with the ambient light.

Visual information is displayed on the waveguide by directing display light through the waveguide. The display light may be generated by a light source that can be driven at different optical powers. The operating requirements may limit the range of display brightness or contrast available to the display system.

SUMMARY

In some embodiments, a display system includes a first light source, a second light source, at least one movable mirror, and an attenuator. The first light source is configured to provide a first light in a first optical path. The second light source is configured to provide a second light in a second optical path. A portion of the second optical path overlaps the first optical path in an overlapping portion. The attenuator is positioned in at least the first optical path and configured to attenuate at least the first light. The movable mirror is movable to deflect the overlapping portion.

In some embodiments, a display system includes a first light source, a second light source, at least one movable mirror, a first attenuator, and a second attenuator. The first light source is configured to provide a first light in a first optical path. The second light source is configured to provide a second light in a second optical path. A portion of the second optical path overlaps the first optical path in an overlapping portion. The first attenuator is positioned optically between the first light source and the mirror. The second attenuator is positioned optically between the second light source and the mirror. The movable mirror is movable to deflect the overlapping portion.

In some embodiments, a method of displaying visual information to a user includes emitting a first light, emitting a second light, attenuating the first light with a first attenuator, attenuating the second light with a second attenuator, and presenting visual information to a user using the first light and the second light.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure generally relates to devices, systems, and methods for providing visual information to a user. More specifically, the present disclosure relates to display brightness adjustment providing visual information to a user. In some embodiments, visual information may be provided to a user by a near-eye display. A near-eye display may be any display that is positioned near a user's eye, either to supplement a user's view of their surroundings, such as augmented or mixed reality devices, or to replace the user's view of their surroundings, such as virtual reality devices. In some embodiments, an augmented reality or mixed reality device may be a head-mounted display (HMD) that presents visual information to a user overlaid on the user's view of their surroundings. For example, the visual information from the HMD may be combined with ambient or environment light to overlay visual information, such as text or images, on a user's surroundings.

In some embodiments, the user's field of view may be at least partially encompassed by a waveguide through which the user views their surroundings. The waveguide may direct display light from a light engine to the user's field of view. The waveguide may guide the display light before outcoupling the light. Upon outcoupling the light, the waveguide may combine the visual information of the display light with ambient light from the user's surroundings to deliver the visual information to the user. Overlaying the visual information from the HMD on the user's surroundings may require precise generation and positioning of the visual information relative to the user's eyes. Matching a brightness, contrast, or color temperature of the visual information to the ambient light and surrounding physical environment may provide a more comfortable and intuitive experience for a user.

Figure 1:
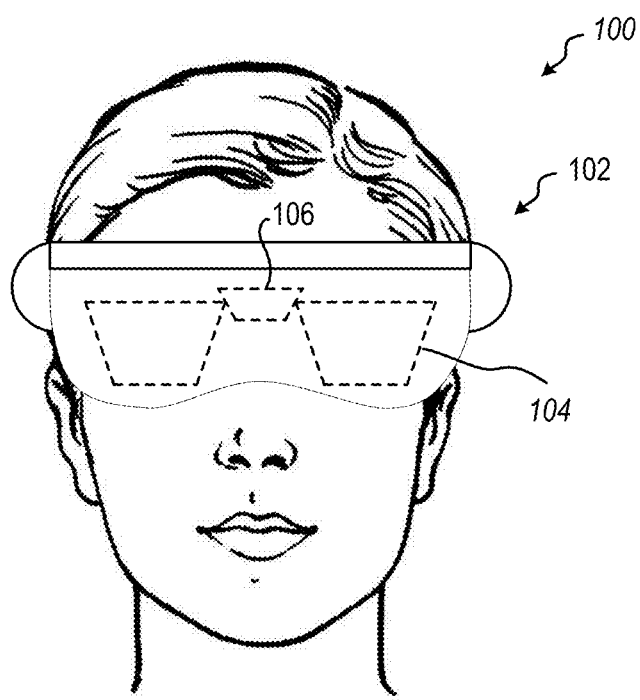
FIG. 1 is a perspective view of a head-mounted display (HMD) including a waveguide, according to at least one embodiment of the present disclosure.

FIG. 1 is a perspective view of a user 100 wearing a HMD 102. In some embodiments, the HMD 102 may have a waveguide 104 positioned near the user 100 to direct visual information to the user 100. The HMD 102 may include a single waveguide 104, a separate waveguide 104 for each of the user's eyes (i.e., two waveguides 104), or more than two waveguides 104 to provide visual information over a larger field of view.

In some embodiments, the waveguide 104 may include surface relief gratings (SRG) to extract the visual information from the total internal reflection of the waveguide 104. The SRG may outcouple visual information that is provided to the waveguide 104 by one or more electronic components of the HMD 102. In some embodiments, the HMD 102 may include one or more processors, storage devices, power supplies, audio devices, display devices, cameras, communication devices, or combinations thereof, that receive, collect, store, process, or calculate information that is provided to the user. For example, a light engine 106 may be positioned optically adjacent the waveguide(s) to provide visual information to the waveguide(s) 104.

Figure 2:
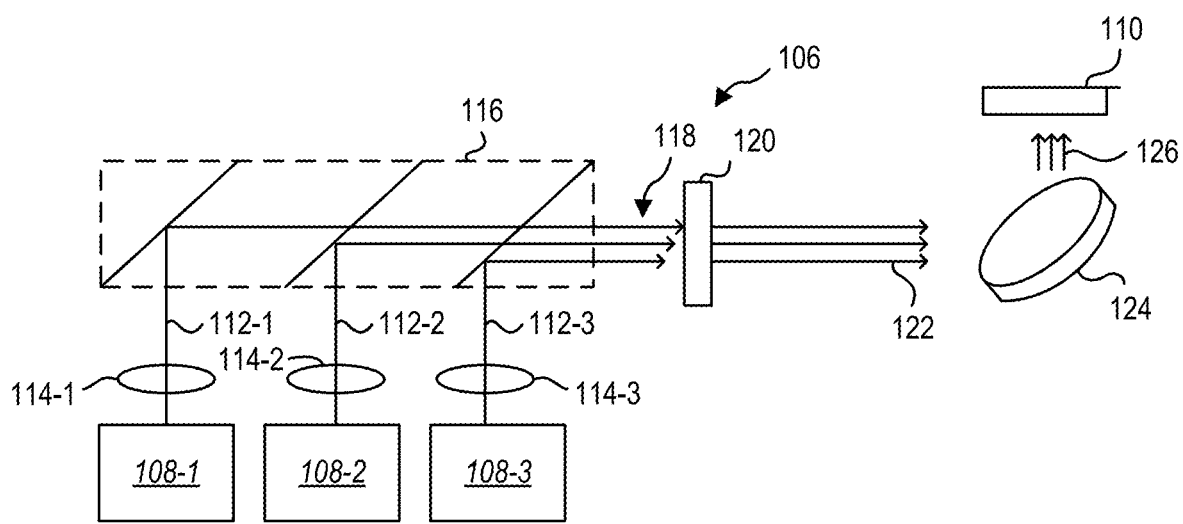
FIG. 2 is a schematic representation of a light engine with a variable optical attenuator, according to at least one embodiment of the present disclosure.

FIG. 2 is a schematic view of an embodiment of a light engine 106 according to the present disclosure that may be used in an HMD (such as HMD 102 described in relation to FIG. 1) or in other electronic devices with visual displays. In some embodiments, a light engine 106 may include a plurality of light sources 108-1, 108-2, 108-3 configured to provide different channels of a display light to an in-coupling optical element 110 of the waveguide. For example, the first light source 108-1 may provide a first light 112-1, a second light source 108-2 may provide a second light 112-2, and a third light source 108-3 may provide a third light 112-3. In some embodiments, the first light 112-1 may be a red light, the second light 112-2 may be a green light, and the third light 112-3 may be a blue light. Together, the first light source 108-1, second light source 108-2, and third light source 108-3 may provide the different channels of a RGB color display. In other embodiments, the first light source 108-1, second light source 108-2, and third light source 108-3 may provide yellow light, cyan light, and magenta light, respectively, to produce the different channels of a YCM color display.

In some embodiments, the light sources 108-1, 108-2, 108-3 may be laser light sources. In other embodiments, the light sources 108-1, 108-2, 108-3 may be light-emitting diode light sources. In yet other embodiments, the light sources 108-1, 108-2, 108-3 may be laser diodes. For example, the light sources 108-1, 108-2, 108-3 may be solid-state laser light sources that produce a coherent light 112-1, 112-2, 112-3 upon application of threshold current to the laser diode.

The light 112-1, 112-2, 112-3 from the light sources 108-1, 108-2, 108-3 may be emitted and collimated through collimators 114-1, 114-2, 114-3. The collimated light 112-1, 112-2, 112-3 may then enter an optical combiner 116, such as a prism) that combines the individual channels of light 112-1, 112-2, 112-3 from the individual light sources 108-1, 108-2, 108-3 in an overlapping portion 118 of the optical path before the light 112-1, 112-2, 112-3 may be used to present visual information to a user.

In a conventional laser light source, the brightness (e.g., the number of photons) produced by a laser diode is controlled by the driving current. For example, above the threshold current, the relationship between brightness and driving current is approximately linear, allowing a user to change the driving current to change the brightness. However, as the driving current is lowered and approaches the threshold current, the linearity of the relationship begins to change and the relationship between brightness and driving current becomes non-linear. The light output may also become unstable and create additional image quality issues. In at least one embodiment, the laser diode light source may have a threshold current of 12.0 milliamperes (mA)

To provide increased control over the brightness of the display light presented to a user, a light engine 106 according to the present disclosure may include at least one attenuator 120 positioned in the optical path of the display light. In some embodiments, the attenuator 120 may be a liquid crystal attenuator, which includes a vertically aligned nematic liquid crystal attenuator, or parallel aligned nematic liquid crystal attenuator, or twisted nematic liquid crystal attenuator, or other type of liquid crystal attenuator. In other embodiments, the attenuator 120 may be a fiber attenuator.

The attenuator 120 may be positioned in the optical path of the light 112-1, 112-2, 112-3 to attenuate the light 112-1, 112-2, 112-3. For example, the attenuator 120 may be a continuously variable transmission attenuator, such that an applied voltage and/or current may alter the optical transmission of the attenuator 120. The light source 108-1, 108-2, 108-3 may, therefore, operate at a driving current in the linear range, while the optical attenuator 120 may be altered to transmit only a portion of the incident light 112-1, 112-2, 112-3.

In some embodiments, the resulting attenuated light 122 may be passed to a movable mirror 124, which may deflect the attenuated light 122 as a deflected light 126 toward the in-coupling optical element 110. In other embodiments, the attenuated light 122 may be displayed to the user without further deflection by a movable mirror and/or transmission through a waveguide. For example, an attenuator 120 may be positioned at each pixel of a pixel array (e.g., a LED array) used to display visual information to a user.

Figure 3:
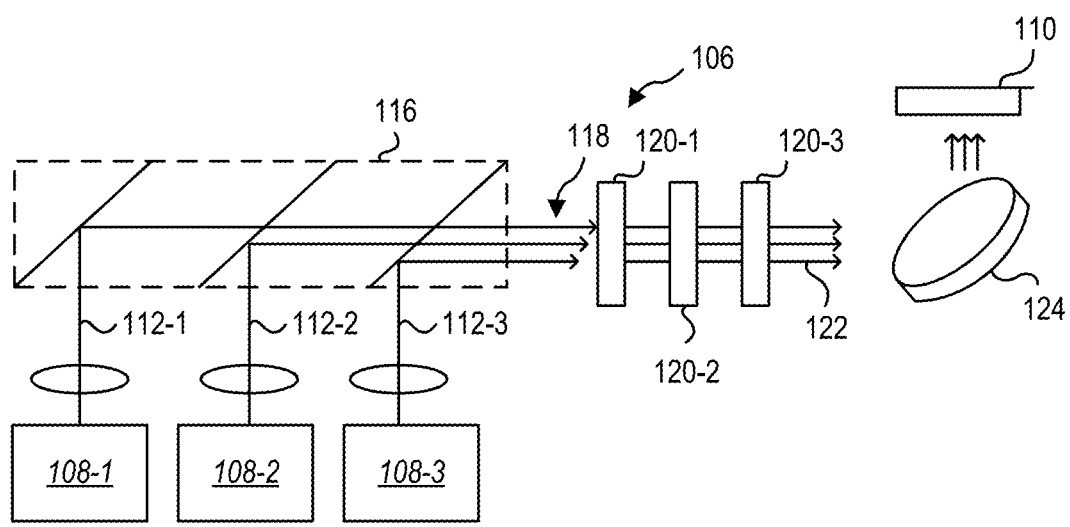
FIG. 3 is a schematic representation of a light engine with a plurality of variable optical attenuators in series, according to at least one embodiment of the present disclosure.

FIG. 3 illustrates the embodiment of a light engine 106 of FIG. 2 with a plurality of attenuators 120-1, 120-2, 120-3 positioned in the overlapping portion 118 of the optical path. In some embodiments, a first light source 108-1 may provide a first light 112-1, a second light source 108-2 may provide a second light 112-2, and a third light source 108-3 may provide a third light 112-3, like the embodiment in FIG. 2. In some embodiments, the light 112-1, 112-2, 112-3 may pass through the combiner 116 and through the attenuators 120-1, 120-2, 120-3.

While the embodiment of a light engine 106 of FIG. 2 includes an attenuator 120 that may attenuate the display light to present the desired brightness of visual information to a user, the light engine of FIG. 3 may include a plurality of attenuators 120-1, 120-2, 120-3 that each preferentially attenuate a different portion of the display light. For example, a first attenuator 120-1 may attenuate a greater portion (i.e., having a lower optical transmission) of the first light 112-1 than the second light 112-2 and third light 112-3. The second attenuator 120-2 may attenuate a greater portion (i.e., having a lower optical transmission) of the second light 112-2 than the first light 112-1 and third light 112-3. The third attenuator 120-3 may attenuate a greater portion (i.e., having a lower optical transmission) of the third light 112-3 than the first light 112-1 and second light 112-2. In some embodiments, at least one of the attenuators 120-1, 120-2, 120-3 may be a notch filter with a variable optical transmission. For example, at least one attenuator 120-1, 120-2, 120-3 may have a first optical transmission of the first light 112-1 that is less than half of a second optical transmission of the second light 112-2 and the third light 112-3.

After passing through the plurality of attenuators 120-1, 120-2, 120-3, the attenuated light 122 may be deflected by a movable mirror 124 toward the in-coupling optical element 110 of a waveguide. In some embodiments, the attenuated light 122 may have a different color balance than the light 112-1, 112-2, 112-3 as emitted from the light sources 108-1, 108-2, 108-3. For example, the plurality of attenuators 120-1, 120-2, 120-3 may each be driven at different attenuation rates, such that the optical transmission of the first light 112-1, second light 112-2, and third light 112-3 through the attenuators 120-1, 120-2, 120-3 are different.

In at least one example, a color balance of the visual information displayed to a user may be shifted toward a warmer display temperature in the evening and night to limit a user's exposure to blue light, which may disrupt circadian rhythms. In at least another example, a color balance of the visual information displayed to a user may be shifted toward a green color balance when the user is in a predominantly green physical environment, such as a greenhouse. As the surrounding physical environment may have diffuse light that is reflected from nearby surfaces, a virtual object presented in a MR display may appear better integrated into the physical environment when the display is shifted toward a green palette bias.

In some embodiments, each of the plurality of serial attenuators of FIG. 3 may attenuate all wavelengths of the display light (i.e., the first attenuator 120-1, while configured to preferentially attenuate the first light 112-1 may attenuate at least a portion of the second light 112-2 and/or third light 112-3). This broad-spectrum attenuation of the visible spectrum may be desirable in low-light environments, such as indoor applications, to match the brightness of the visual information presented to a user with the ambient brightness. In some embodiments, the broad-spectrum attenuation may limit the overall maximum brightness of the display.

Figure 4:
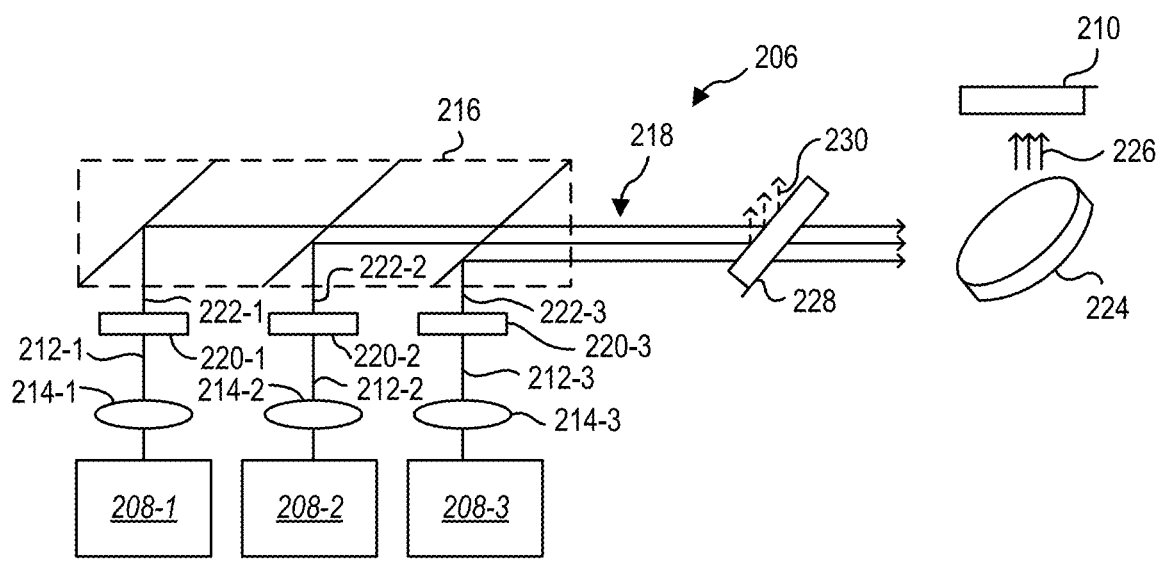
FIG. 4 is a schematic representation of a light engine with a plurality of variable optical attenuators in parallel, according to at least one embodiment of the present disclosure.

FIG. 4 illustrates an embodiment of a light engine 206 with a plurality of attenuators 220-1, 220-2, 220-3 positioned in parallel and optically between the light sources 208-1, 208-2, 208-3 and the combiner 216. While the embodiments of a light engine 106 described in relation to FIG. 2 and FIG. 3 illustrate attenuators positioned in series in the overlapping portion 118 of the optical path, in some embodiments such as that illustrated in FIG. 4, attenuators 220-1, 220-2, 220-3 may be positioned in the separate optical paths of the first light 212-1, the second light 212-2, and the third light 212-3 before the combiner 216 combines the first light 212-1, second light 212-2, and third light 212-3 into the overlapping portion 218.

Positioning attenuators 220-1, 220-2, 220-3 in the optical paths of the first light 212-1, the second light 212-2, and the third light 212-3, respectively, may allow for the individual attenuation of the first light 212-1, the second light 212-2, and the third light 212-3 independently. For example, the first attenuator 220-1 may be activated to attenuate the first light 212-1 only, while the second light 212-2 and third light 212-3 are transmitted to the combiner 216 with no attenuation.

The resulting first attenuated light 222-1, second attenuated light 222-2, and third attenuated light 222-3 may be combined by the combiner 216 in an overlapping portion 218 of the optical path. In some embodiments, a polarizer 228 may be positioned in the overlapping portion 218 to pass only a portion of the polarized light to the movable mirror 224. For example, the polarizer 228 may be a reflective polarizer that reflects a portion 230 of the light while passing the remaining light to the mirror 224. In other examples, the polarizer 228 may be an absorptive polarizer that absorbs the unwanted polarized portion of the display light. The deflected light 226 provided to the in-coupling optical element 210 may, therefore, include only polarized display light.

Figure 5:
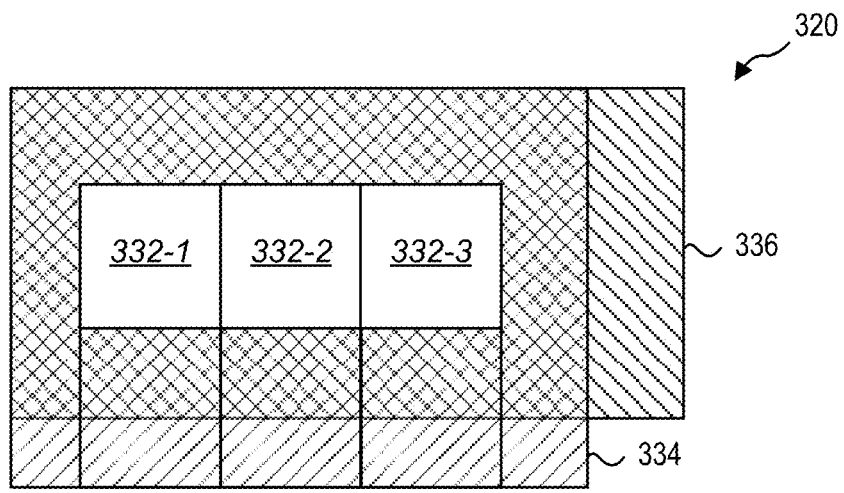
FIG. 5 is a top view of a three-pixel liquid crystal optical attenuator, according to at least one embodiment of the present disclosure.

The attenuator may be a single-pixel attenuator. In other embodiments, the attenuator may be a multipixel attenuator with the first attenuator 220-1, second attenuator 220-2, and third attenuator 220-3 in a single structure, configured to receive and attenuate optical paths in parallel. For example, FIG. 5 illustrates an embodiment of a three-pixel liquid crystal attenuator 320. The attenuator 320 may include a first pixel 332-1, a second pixel 332-2, and a third pixel 332-3. In some embodiments, the optical transmission of the pixels 332-1, 332-2, 332-3 may be independently adjustable by changing the voltage applied to each.

In some embodiments, each pixel 332-1, 332-2, 332-3 may be positioned in a different optical path of the light engine. For example, the first pixel 332-1 may be positioned in the optical path of the first light, the second pixel 332-2 may be positioned in the optical path of the second light, and the third pixel 332-3 may be positioned in the optical path of the third light. In such an example, the first pixel 332-1 may be the first attenuator (such as the first attenuator 220-1 described in relation to FIG. 4), the second pixel 332-2 may be the second attenuator (such as the second attenuator 220-2 described in relation to FIG. 4), and the third pixel 332-3 may be the third attenuator (such as the third attenuator 220-3 described in relation to FIG. 4).

In some embodiments, the pixels 332-1, 332-2, 332-3 may be in electrical communication with at least a first electrode 334 and a second electrode 336. The application of a voltage between the first electrode 334 and second electrode 336 may apply an electrical bias to each of the pixels 332-1, 332-2, 332-3. The optical transmission of each pixel 332-1, 332-2, 332-3 of the liquid crystal attenuator 320 may be related to the voltage across the pixel 332-1, 332-2, 332-3. In some embodiments, different voltages may be applied to each pixel 332-1, 332-2, 332-3 to alter the optical transmission of each pixel 332-1, 332-2, 332-3 independently.

In some embodiments, the attenuator 320 may have more than three pixels. For example, a light engine may include four light sources and the attenuator 320 may include four or more pixels. In other embodiments, the attenuator 320 may have less than three pixels.

Figure 6:
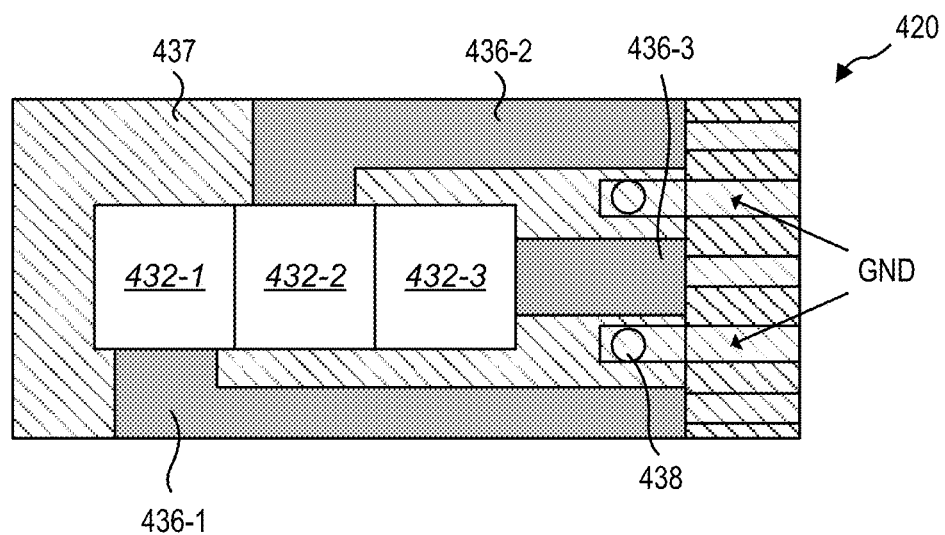
FIG. 6 is a top view of another three-pixel liquid crystal optical attenuator, according to at least one embodiment of the present disclosure.

FIG. 6 illustrates another embodiment of a one-cell liquid crystal attenuator 420 with three pixels 432-1, 432-2, 432-3. The pixels 432-1, 432-2, 432-3 may be in electrical communication with a first electrode 434 and a plurality of second electrodes 436-1, 436-2, 436-3. In some embodiments, the electrodes 434, 436-1, 436-2, 436-3 may be in a single side of the attenuator 420. For example, the first electrode 434 may be in electrical communication with a substrate 437 of the flexible printed circuit (FPC) by a conductive glue 438. In at least one embodiment, such "cross-over" construction may simplify manufacturing and/or packing of the attenuator 420 for the light engine.

Figure 7:
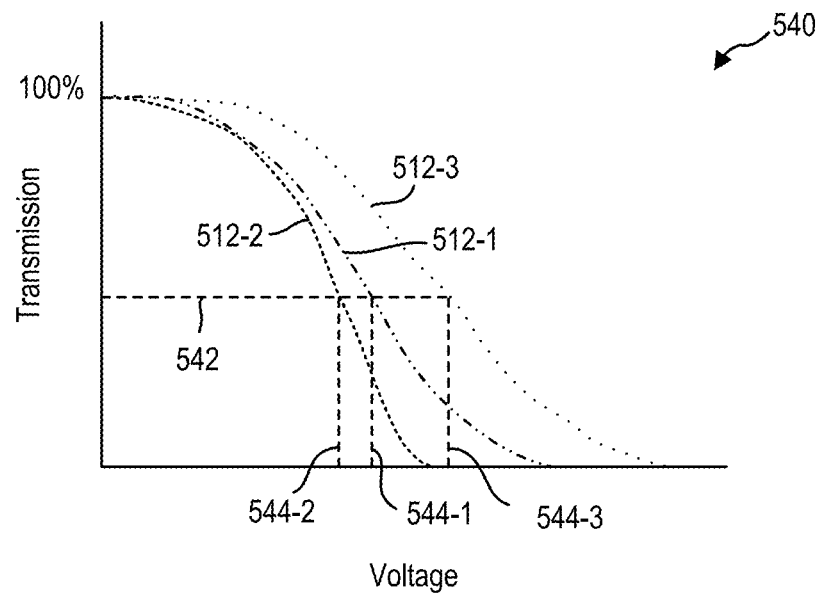
FIG. 7 is a graph illustrating a color calibration of a light engine including a plurality of optical attenuators, according to at least one embodiment of the present disclosure.

In some embodiments, individual control of the attenuators of the plurality of attenuators according to the present disclosure may allow for color balance adjustment and/or calibration. FIG. 7 is a graph 540 illustrating the transmission curve of an attenuator relative to voltage. The graph 540 illustrates an example of a first transmission curve for a first light 512-1, an example of a second transmission curve for a second light 512-2, and an example of a transmission curve for a third light 512-3.

In some embodiments, a desired transmission rate 542, such as approximately 50% transmission, may occur at different voltages for different wavelengths of the light attenuated. For example, the desired transmission rate 542 may occur at a first voltage 544-1 for the first light 512-1, at a second voltage 544-2 less than the first voltage 544-1 for the second light 512-2, and at a third voltage 544-3 greater than the first voltage 544-1 for the third light 512-3. To attenuate each light 512-1, 512-2, 512-3 of the display light the same amount (e.g., the desired transmission rate 542), a first attenuator may have the first voltage 544-1 applied, a second attenuator may have the second voltage 544-2 applied, and a third attenuator may have the third voltage 544-3 applied.

Figure 8:
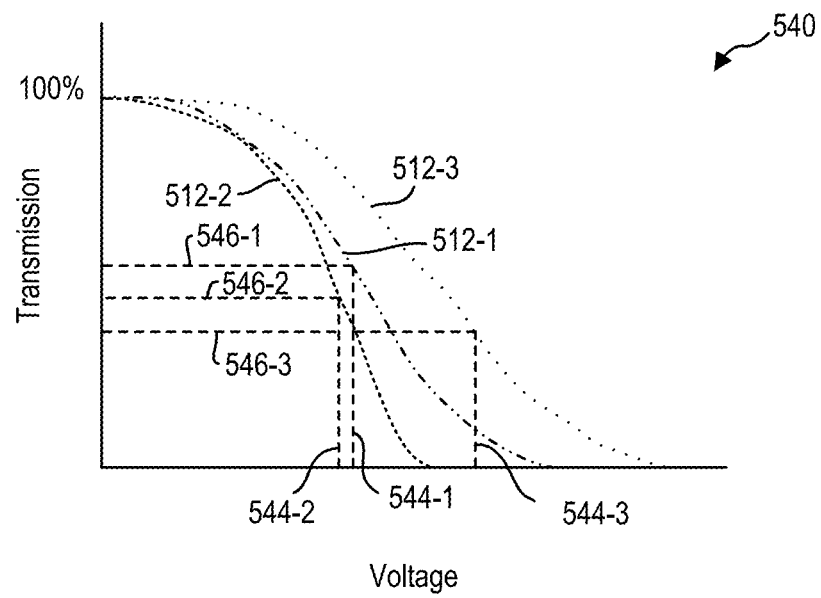
FIG. 8 is a graph illustrating a color balance shift of a light engine including a plurality of optical attenuators, according to at least one embodiment of the present disclosure.

In some embodiments, attenuators (or pixels of an attenuator) may have different voltages applied to produce different transmission rates for each attenuator relative to the light transmitted through that attenuator. For example, FIG. 8 illustrates an example transmission curve 540 with voltages 544-1, 544-2, 544-3 selected to set attenuators to transmit the display light with a green-biased color balance.

In some embodiments, a first attenuator may have a first voltage 544-1 applied thereto and may be positioned in the optical path of the first light 512-1. A second attenuator may have a second voltage 544-2 applied thereto and may be positioned in the optical path of the second light 512-2. A third attenuator may have a third voltage 544-3 applied thereto and may be positioned in the optical path of the third light 512-3.

The first light 512-1 may be a green light, and the first voltage 544-1 may correspond to a first optical transmission rate 546-1 of approximately 50% at the wavelength of the first light 512-1. The second light 512-2 may be a blue light, and the second voltage 544-2 may correspond to a second optical transmission rate 546-2 of approximately 40% at the wavelength of the second light 512-2. The third light 512-3 may be a red light, and the third voltage 544-3 may correspond to a third optical transmission rate 546-3 of approximately 30% at the wavelength of the third light 512-3. The resulting transmission rate of the attenuators may pass 50% of the green light, 40% of the blue light, and 30% of the red light to the waveguide or other display. The visual information generated by the light sources of the light engine may, thereby, be shifted toward a green and blue light bias and a cooler color temperature. In other embodiments, the attenuators may be adjusted to transmit more of the second light 512-2 and/or more of the third light 512-3 (i.e., a red light bias for warmer temperatures).

Figure 9:
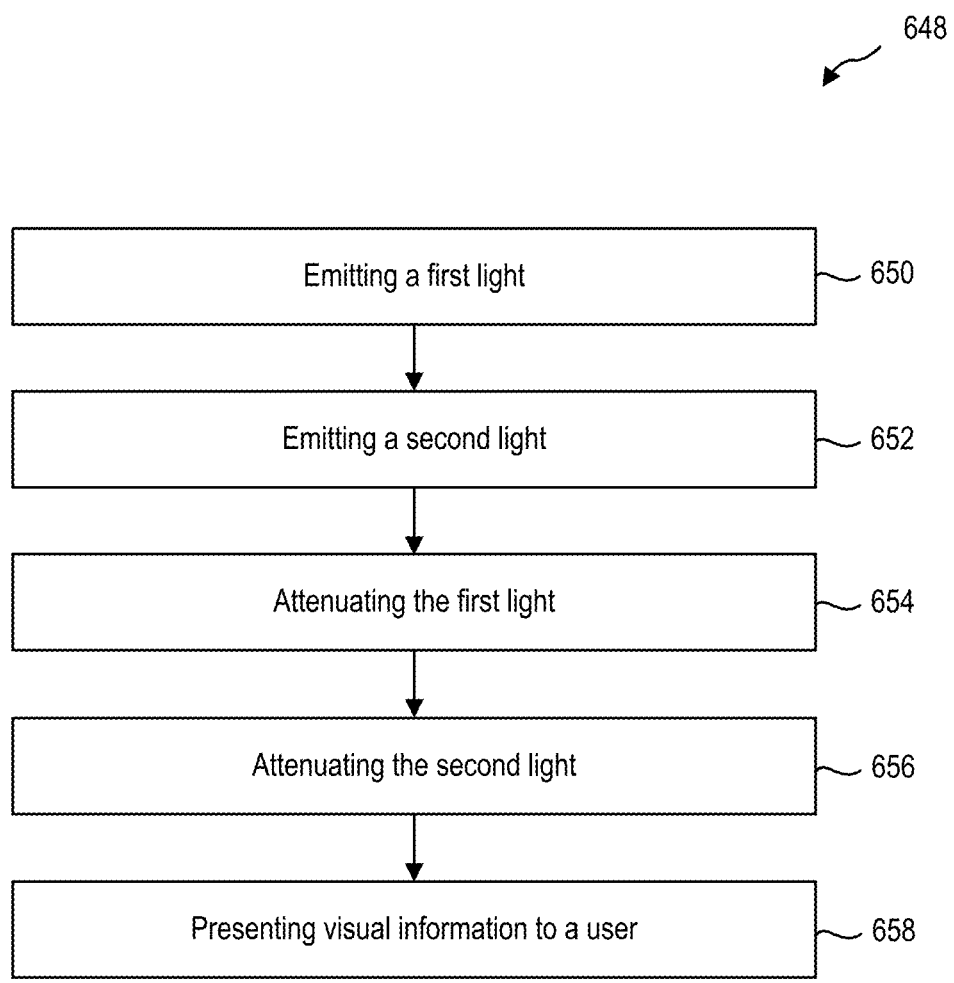
FIG. 9 is a flowchart illustrating a method of presenting visual information to a user, according to at least one embodiment of the present disclosure.

FIG. 9 is a flowchart illustrating an embodiment of a method 648 of presenting visual information to a user, according to the present disclosure. In some embodiments, the method 648 may include emitting at least a first light at 650 and emitting at least a second light at 652. The method 648 may further include attenuating the first light with a variable optical transmission rate attenuator at 654 and attenuating the second light with a variable optical transmission rate attenuator at 656. Finally, the attenuated light may be used in presenting visual information to a user at 658.

In some embodiments, emitting the first light and emitting the second light may further include emitting a third light. Emitting light may include using a laser light source, a light-emitting diode light source, a laser diode light source, or other light sources. In some embodiments, attenuating the first light and second light may further include attenuating a third light.

In some embodiments, attenuating the first light and the second light may include using the same attenuator positioned in an overlapping portion of the optical path. In other embodiments, attenuating the first light and the second light may include using a plurality of optical attenuators positioned in series in the overlapping portion of the optical path. For example, each attenuator in series may preferentially attenuate a different wavelength of light. In yet other embodiments, attenuating the first light and the second light may include using a plurality of optical attenuators positioned in parallel. A first attenuator of the plurality of optical attenuators may be positioned optically between the light source of the first light and a combiner and a second attenuator of the plurality of optical attenuators may be positioned optically between the light source of the second light and the combiner in the overlapping portion of the optical path.

In some embodiments, attenuating the first light and the second light may include using a liquid crystal optical attenuator. In yet other embodiments, attenuating the first light and the second light may include using a fiber attenuator.

In some embodiments, attenuating the first light and the second light may include adjusting an optical transmission rate of at least a first attenuator. The optical transmission rate of the first attenuator may be adjusted by altering an electrical voltage across the first attenuator. For example, increasing the voltage may reduce the optical transmission rate. In other embodiments, the optical transmission rate of the first attenuator may be adjusted by altering an electrical current across the first attenuator. For example, increasing the current may reduce the optical transmission rate.

In some embodiments, the amount by which the optical transmission rate is adjusted may be related to a predetermined color balance. For example, the light sources of the light engine may be driven at constant driving currents and constant optical powers, while the attenuators may vary the transmission of the first light and second light (for example, the red light channel and the blue light channel) to alter the color balance of the visual information. In some examples, the predetermined color balance may be user selected. In other examples, the predetermined color balance may include accessing information from a computing device, one or more sensors, a communication device, or combinations thereof.

For example, the predetermined color balance may be based at least partially upon the time of day, such as presenting a warmer color balance at night. In other examples, the predetermined color balance may be based on ambient light, such as adjusting the color balance to match the spectrum of the ambient light. In yet other examples, the predetermined color balance may be based upon information accessed from a remote and/or network storage device, such as a user profile stored on a networked computing device accessed by a communication device of the HMD.

In some embodiments, presenting visual information to a user may include presenting attenuated light to a user on a HMD. For example, the HMD may include a waveguide, and the attenuated light may be in-coupled to the waveguide. The attenuated light may be deflected by a movable mirror to raster the optical path to generate frames of visual information. In other examples, the attenuated light may be presented as a single pixel in an array of pixels that may present the visual information to a user.

In at least one embodiment, a light engine according to the present disclosure may allow for a larger dynamic range of brightness by allowing the display of visual information at brightness values below the threshold current of the light source. In other embodiments, a light engine according to the present disclosure may allow for a dynamically adjustable color balance and/or color balance calibration at a hardware level of the light engine. For example, the light source(s) of a light engine may emit different wavelength length over the operational lifetime of the device. A light engine according to the present disclosure may allow for the correction of the emission wavelength drift without changing the driving current of the light source.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A display system for use in a near-eye display, the display system comprising: a first light source configured to provide a first light in a first optical path, the first light being a first color channel of a display light; a second light source configured to provide a second light in a second optical path, the second light being a second color channel of the display light, wherein at least a portion of the second optical path overlaps the first optical path in an overlapping portion; an attenuator positioned in the first optical path optically before the overlapping portion and configured to attenuate the first light; and at least one movable mirror movable to deflect the overlapping portion.

2. The system of claim 1, the attenuator is a continuously variable optical attenuator.

3. The system of claim 1, the attenuator is positioned in the overlapping portion.

4. The system of claim 1, further comprising a third light source configured to provide a third light in a third optical path, wherein at least a portion of the third optical path overlaps the first optical path and second optical path in the overlapping portion.

5. The system of claim 1, the attenuator being a fiber attenuator.

6. The system of claim 1, the first light source having a threshold current of at least 12 mA.

7. The system of claim 1, further comprising a polarizer positioned in the overlapping portion.

8. The system of claim 1, the attenuator being a first attenuator, and further comprising a second attenuator positioned in at least the second optical path and configured to preferentially attenuate the second light relative to the first light.

9. The system of claim 8, at least one of the first attenuator and the second attenuator positioned in the overlapping portion.

10. The system of claim 1, the attenuator being a notch filter.

11. A display system for use in a head-mounted display, the display system comprising:
 a first light source configured to provide a first light in a first optical path, the first light being a first color channel of a display light;
 a second light source configured to provide a second light in a second optical path, the second light being a second color channel of a display light;
 a combiner positioned in the first optical path and the second optical path to combine the first optical path and second optical path such that at least a portion of the second optical path overlaps the first optical path in an overlapping portion;
 at least one movable mirror movable to deflect the overlapping portion;
 a first attenuator positioned optically between the first light source and the combiner; and
 a second attenuator positioned optically between the second light source and the combiner.

12. The system of claim 11, further comprising a polarizer positioned between the combiner and the mirror at an end of the overlapping portion.

13. The system of claim 11, further comprising:
 a third light source configured to provide a third light in a third optical path; and
 a third attenuator positioned optically between the third laser source and the mirror.

14. The system of claim 13, the first light source being a red light source, the second light source being a green light source, and the third laser source being a blue light source.

15. The system of claim 11, the first attenuator and the second attenuator each being a pixel of liquid crystal attenuator.

16. The system of claim 11, further comprising a waveguide of the head-mounted display, where the at least one movable mirror deflects the overlapping portion toward the waveguide.

17. A method of displaying visual information to a user in a head-mounted display, the method comprising:
 emitting a first light in a first optical path;
 emitting a second light in a second optical path;
 attenuating the first light with a first attenuator;
 attenuating the second light with a second attenuator;
 after attenuating the first light and the second light, combining the first light and the second light with a combiner into an overlapping optical path; and
 presenting visual information to a user using the first light and the second light.

18. The method of claim 17, further comprising:
 emitting a third light; and
 attenuating the third light with a third attenuator.

19. The method of claim 17, attenuating the first light including attenuating the first light by a first amount of light and attenuating the second light by a second amount of light, the first amount and second amount being different.

20. The method of claim 19, the first amount and second amount being selected based at least partially on a predetermined color balance.

* * * * *